(12) United States Patent
Prater et al.

(10) Patent No.: US 9,114,693 B2
(45) Date of Patent: Aug. 25, 2015

(54) DAYLIGHT OPENING SYSTEM

(71) Applicant: SRG Global, Inc., Warren, MI (US)

(72) Inventors: David Prater, Canton, MI (US); Patrick Fenchak, Rochester Hills, MI (US)

(73) Assignee: SRG Global, Inc., Warren, MI (US)

( * ) Notice: Subject to any disclaimer, the term of this patent is extended or adjusted under 35 U.S.C. 154(b) by 0 days.

(21) Appl. No.: 13/869,627

(22) Filed: Apr. 24, 2013

(65) Prior Publication Data

US 2013/0292965 A1   Nov. 7, 2013

Related U.S. Application Data

(60) Provisional application No. 61/642,521, filed on May 4, 2012.

(51) Int. Cl.
| | |
|---|---|
| *B60J 5/04* | (2006.01) |
| *B60J 10/04* | (2006.01) |
| *B60J 10/00* | (2006.01) |
| *B60J 10/08* | (2006.01) |

(52) U.S. Cl.
CPC .......... *B60J 10/0091* (2013.01); *B60J 10/0051* (2013.01); *B60J 10/042* (2013.01); *B60J 10/088* (2013.01); *Y10T 29/49826* (2015.01)

(58) Field of Classification Search
CPC ...... B60J 5/0402; B60J 5/0463; B60J 5/0493; B60J 10/0014; B60J 10/0022; B60J 10/0025; B60J 10/0054
USPC ................ 296/146.1, 152, 154, 146.2, 146.9, 296/1.08; 49/489.1, 490.1, 502
See application file for complete search history.

(56) References Cited

U.S. PATENT DOCUMENTS

| | | | |
|---|---|---|---|
| 4,875,307 A | 10/1989 | Barbero | |
| 5,014,464 A | 5/1991 | Dupuy et al. | |
| 5,317,835 A * | 6/1994 | Dupuy et al. | 49/441 |
| 5,611,550 A | 3/1997 | Belser | |
| 5,702,148 A | 12/1997 | Vaughan et al. | |
| 5,743,047 A * | 4/1998 | Bonne et al. | 49/490.1 |
| 5,899,022 A | 5/1999 | Gaw, Jr. et al. | |
| 6,138,338 A * | 10/2000 | Berry | 29/415 |
| 6,409,251 B1 * | 6/2002 | Kaye et al. | 296/146.9 |

(Continued)

FOREIGN PATENT DOCUMENTS

| | | |
|---|---|---|
| CA | 2691979 A1 | 1/2009 |
| CA | 2742836 A1 | 4/2010 |

(Continued)

OTHER PUBLICATIONS

International Search Report and Written Opinion regarding Application No. PCT/US2013/039385 dated Sep. 17, 2013.

(Continued)

*Primary Examiner* — Gregory Blankenship
(74) *Attorney, Agent, or Firm* — Harness, Dickey & Pierce, PLC (57) ABSTRACT

A daylight opening system for a vehicle window opening may include a module having a carrier, a trim member and a first seal. The carrier may be adapted to be secured to a door of a vehicle. The trim member may be secured to the carrier and may cooperate with the carrier to define a space in which a window pane is selectively receivable. The first seal member may be integrally formed with the carrier and configured to sealingly engage the window pane.

14 Claims, 6 Drawing Sheets

(56) References Cited

U.S. PATENT DOCUMENTS

| | | | |
|---|---|---|---|
| 6,612,074 B1* | 9/2003 | Kaye et al. | 49/441 |
| 6,641,204 B2* | 11/2003 | Ogawa et al. | 296/146.9 |
| 6,679,003 B2 | 1/2004 | Nozaki et al. | |
| 6,692,245 B1 | 2/2004 | Lanoue et al. | |
| 6,702,301 B1 | 3/2004 | Davies et al. | |
| 6,729,674 B2 | 5/2004 | Davis et al. | |
| 6,817,651 B2 | 11/2004 | Carvalho et al. | |
| 7,052,021 B2 | 5/2006 | Plottnik | |
| 7,086,201 B2* | 8/2006 | Struyven et al. | 49/502 |
| 7,118,169 B2* | 10/2006 | Hara et al. | 296/208 |
| 8,205,389 B1* | 6/2012 | Kesh | 49/440 |
| 8,371,069 B2* | 2/2013 | O'Sullivan et al. | 49/492.1 |
| 8,479,449 B2* | 7/2013 | Titz | 49/441 |
| 8,561,353 B2* | 10/2013 | Terai et al. | 49/502 |
| 8,919,846 B2* | 12/2014 | Maass | 296/1.08 |
| 2001/0015035 A1 | 8/2001 | Nozaki | |
| 2001/0025455 A1 | 10/2001 | Nozaki et al. | |
| 2002/0108313 A1* | 8/2002 | Nozaki et al. | 49/441 |
| 2005/0155293 A1 | 7/2005 | Dron | |
| 2007/0000180 A1 | 1/2007 | Oba et al. | |
| 2007/0068085 A1 | 3/2007 | Ninomiya et al. | |
| 2007/0137112 A1 | 6/2007 | Furuzawa et al. | |
| 2007/0187988 A1 | 8/2007 | Koshimichi | |
| 2007/0220811 A1 | 9/2007 | Flendrig et al. | |
| 2007/0251152 A1 | 11/2007 | Takase et al. | |
| 2008/0030046 A1* | 2/2008 | Krause | 296/146.2 |
| 2008/0178531 A1 | 7/2008 | Takeuchi et al. | |
| 2009/0241430 A1 | 10/2009 | Knape | |
| 2011/0126473 A1 | 6/2011 | Prater et al. | |
| 2013/0292965 A1* | 11/2013 | Prater et al. | 296/146.2 |

FOREIGN PATENT DOCUMENTS

| | | |
|---|---|---|
| DE | 69000419 T2 | 4/1993 |
| EP | 0384851 A2 | 8/1990 |
| EP | 0384852 A2 | 8/1990 |
| FR | 2913215 A1 | 9/2008 |
| KR | 20080000195 A | 1/2008 |
| WO | 0006406 A1 | 2/2000 |
| WO | 2007022355 A2 | 2/2007 |
| WO | 2008084320 A1 | 7/2008 |
| WO | 2008132302 A2 | 11/2008 |
| WO | 2009124382 A1 | 10/2009 |

OTHER PUBLICATIONS

International Search Report and Written Opinion regarding Application No. PCT/US2013/039387 dated Sep. 23, 2013.
International Search Report and Written Opinion regarding Application No. PCT/US2010/003062 issued Jun. 5, 2012.
International Search Report and Written Opinion regarding Application No. PCT/us2010/003062 dated Mar. 9, 2011.

* cited by examiner

DAYLIGHT OPENING SYSTEM

CROSS-REFERENCE TO RELATED APPLICATIONS

This application claims the benefit of U.S. Provisional Application No. 61/642,521, filed on May 4, 2012. The entire disclosure of the above application is incorporated herein by reference.

FIELD

The present disclosure relates to a daylight opening system for a vehicle.

BACKGROUND

This section provides background information related to the present disclosure and is not necessarily prior art.

Daylight opening systems are installed in a wide variety of vehicles to permit natural light to enter the vehicle and to provide outside visibility for the vehicle operator. Daylight opening systems also assist in protecting the vehicle interior from external elements (e.g., rain, snow, debris and/or noise). Typical daylight opening systems contain multiple components provided by multiple suppliers and assembled on the vehicle at the vehicle assembly plant. The attachment mechanisms for these multiple components are often arranged within interior componentry of the vehicle to aesthetically appease the vehicle operator. Accordingly, fit/function and ease of replacement are compromised in favor of these design and supply considerations.

SUMMARY

This section provides a general summary of the disclosure, and is not a comprehensive disclosure of its full scope or all of its features.

In one form, the present disclosure provides a daylight opening system for a vehicle window opening may include a carrier, a trim member and a seal. The carrier may be adapted to be secured to a door of a vehicle. The trim member may be secured to the carrier and may cooperate with the carrier to define a space in which a window pane is selectively receivable. The seal member may be integrally formed with the carrier and configured to sealingly engage the window pane. In some embodiments, the carrier, trim member and seal may be pre-assembled and installed onto a vehicle as a module. In some embodiments, the seal may be overmolded onto the carrier by a two-shot molding process.

In another form, the present disclosure provides an apparatus for use with a window opening of a vehicle. The apparatus may include a carrier, a trim member and a seal member. The carrier may be adapted to be secured to a door of the vehicle. The trim member may be secured to the carrier and may cooperate with the carrier to define a space in which a window pane is selectively receivable. The seal member may be integrally formed with the carrier and may be configured to sealingly engage the trim member and a frame member of the vehicle.

In another form, the present disclosure provides a method that may include integrally forming a first sealing member onto a carrier and integrally forming a second sealing member onto the carrier. A daylight opening module may be formed by securing a trim piece onto a first attachment feature of the carrier and securing a molding member onto a second attachment feature of the carrier. Securing the molding member and the trim piece onto the carrier may be done after the first and second sealing members are integrally formed onto the carrier. The daylight opening module may be secured to a door frame of a vehicle such that the first and second sealing members at least partially extend around a window opening in the door frame.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Corresponding reference numerals indicate corresponding parts throughout the several views of the drawings.

DETAILED DESCRIPTION

Example embodiments will now be described more fully with reference to the accompanying drawings.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail.

The terminology used herein is for the purpose of describing particular example embodiments only and is not intended to be limiting. As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments.

Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated ninety degrees or at other orientations) and the spatially relative descriptors used herein interpreted accordingly.

Figure 1:
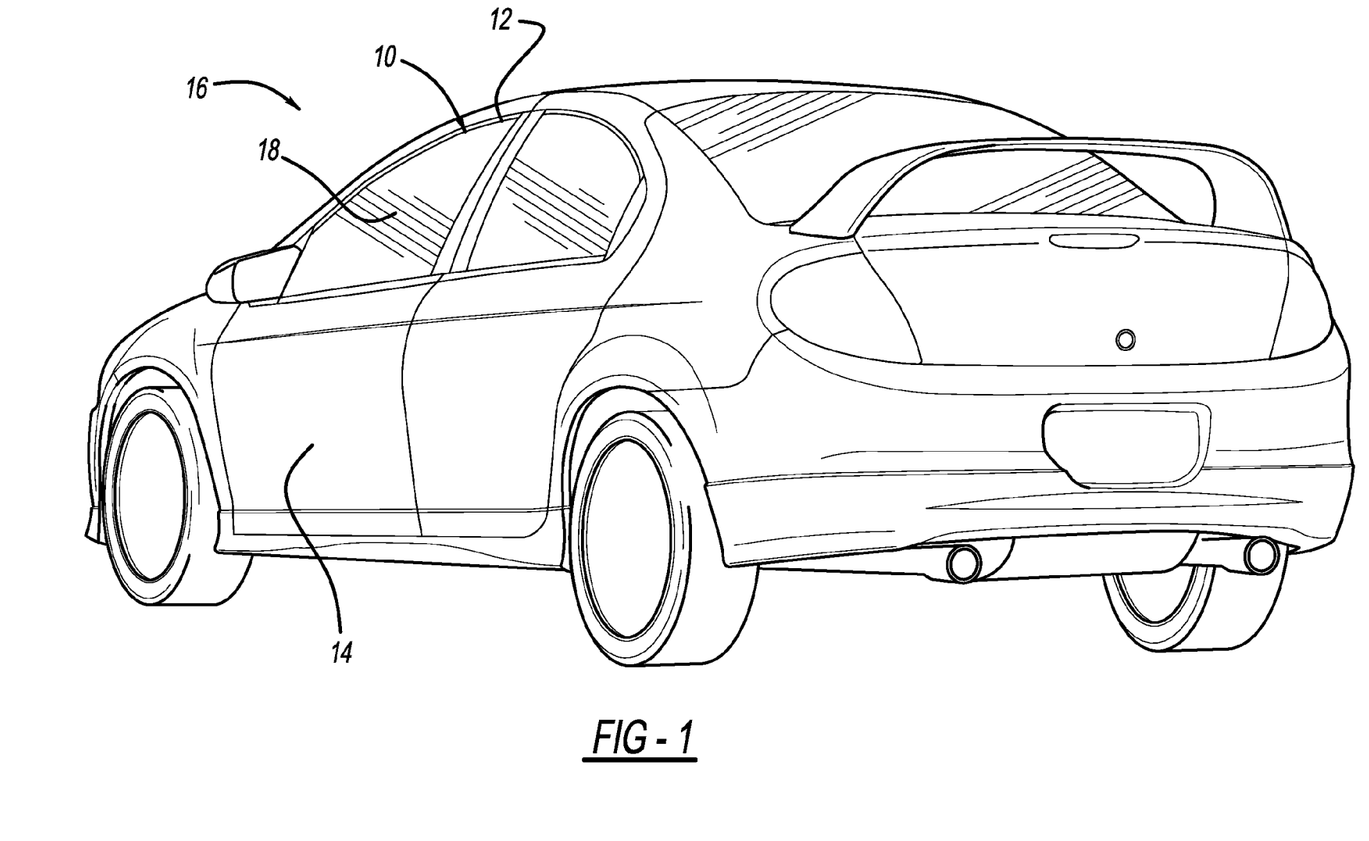
FIG. 1 is a perspective view of a vehicle having a daylight opening system according to the principles of the present disclosure.

With reference to FIGS. 1-6, a daylight opening system 10 according to the principles of the present disclosure is provided. With particular reference to FIG. 1, the daylight opening system 10 may be secured to a window opening 12 in a door frame 14 of a vehicle 16 in order to improve fit and finish of a window pane 18 within the window opening 12, as will be described in more detail below. As shown, the daylight opening system 10 is designed for assembly to a front driver's side window opening. It should be appreciated, however, that the daylight opening system 10 may be reconfigured to accommodate any of the other widow openings 12 in the vehicle 16. Furthermore, the vehicle 16 may be any type of vehicle, including an automotive vehicle such as a car, pickup truck, sport utility vehicle, crossover vehicle, minivan, van, light commercial vehicle, heavy-duty commercial or industrial vehicle, military vehicle, construction or farm equipment or vehicle, or recreational vehicle, for example. It should also be appreciated that the vehicle 16, regardless of the type or class, could include any number of daylight opening systems 10, which correspond to the number of vehicle window openings 12.

Figure 2:
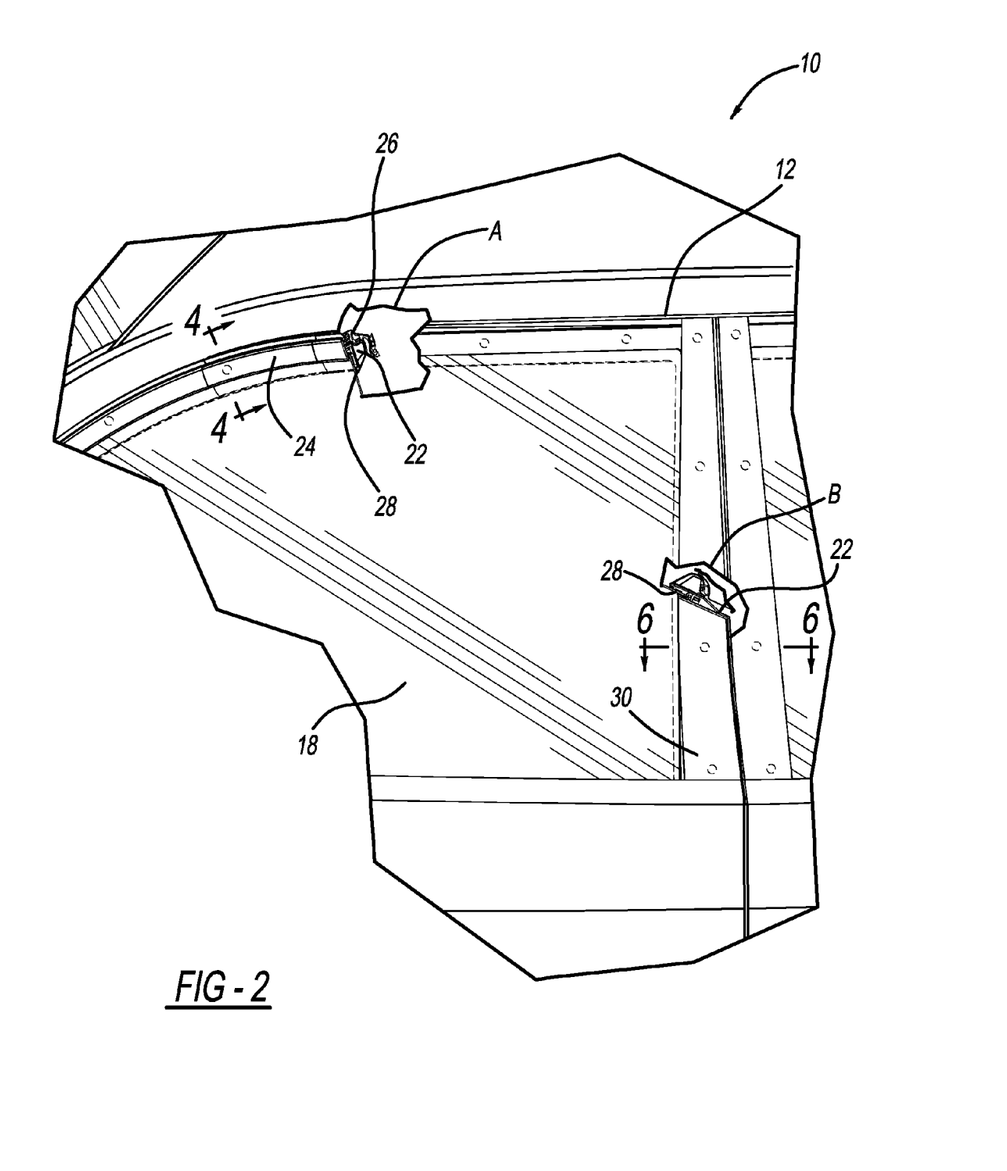
FIG. 2 is a portion of a perspective view of the daylight opening system of FIG. 1.
Figure 3:
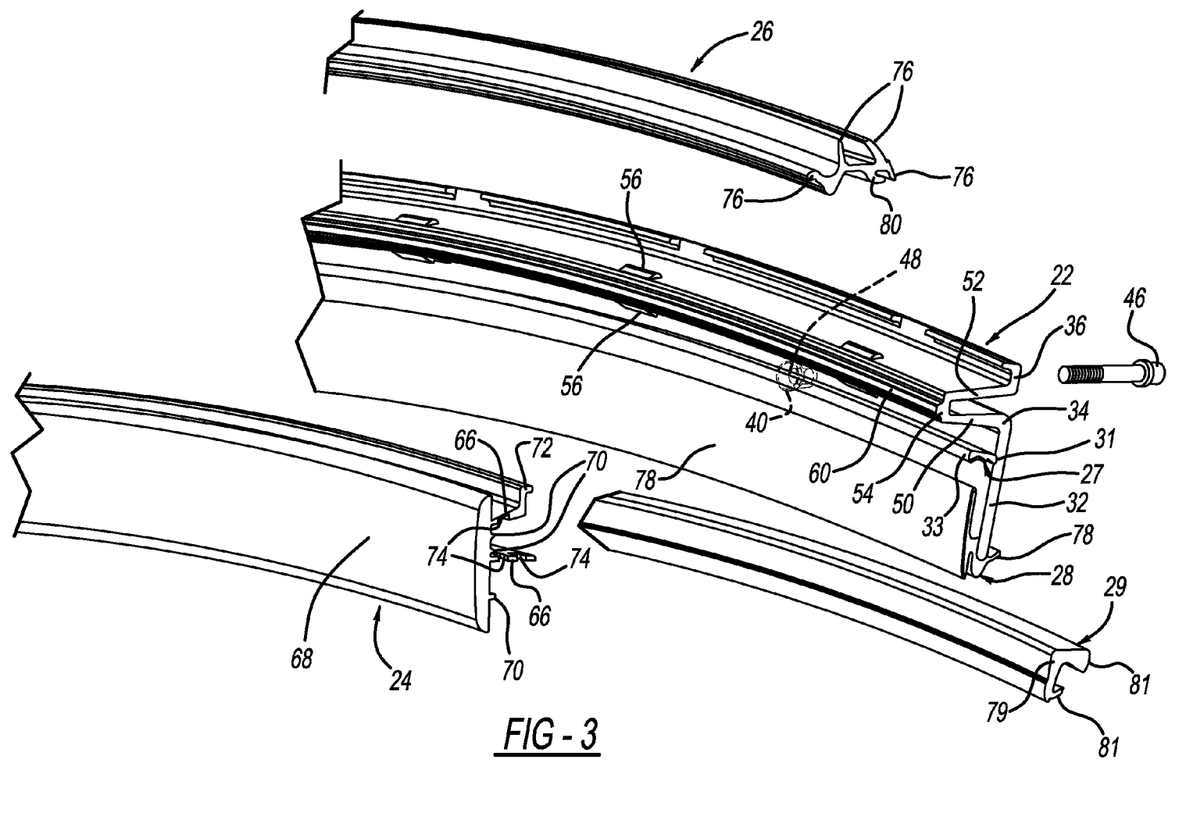
FIG. 3 is an exploded perspective view of an upper portion of the daylight opening system of FIG. 2.
Figure 4:
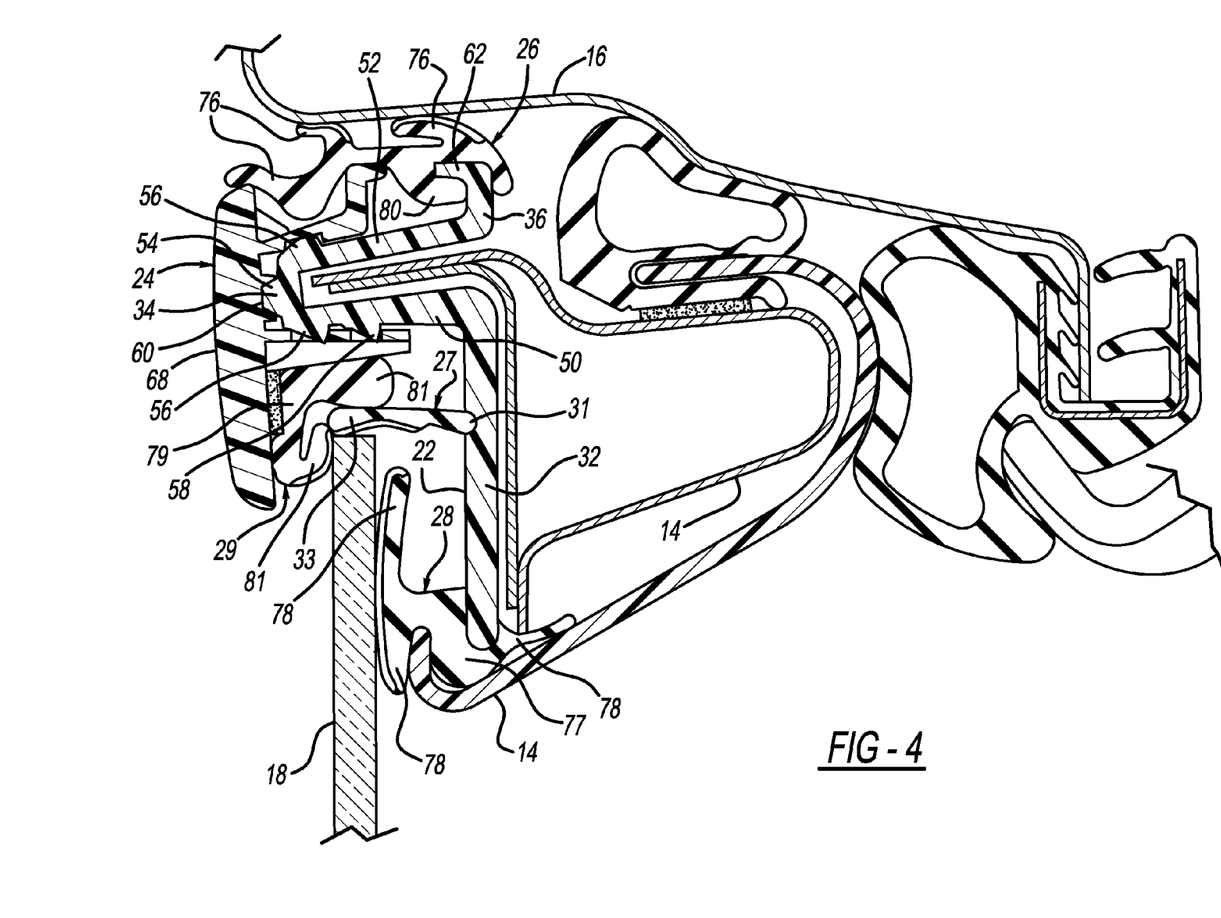
FIG. 4 is a cross-sectional view of the daylight opening system including a carrier secured to a door panel and taken through line 4-4 of FIG. 2.
Figure 5:
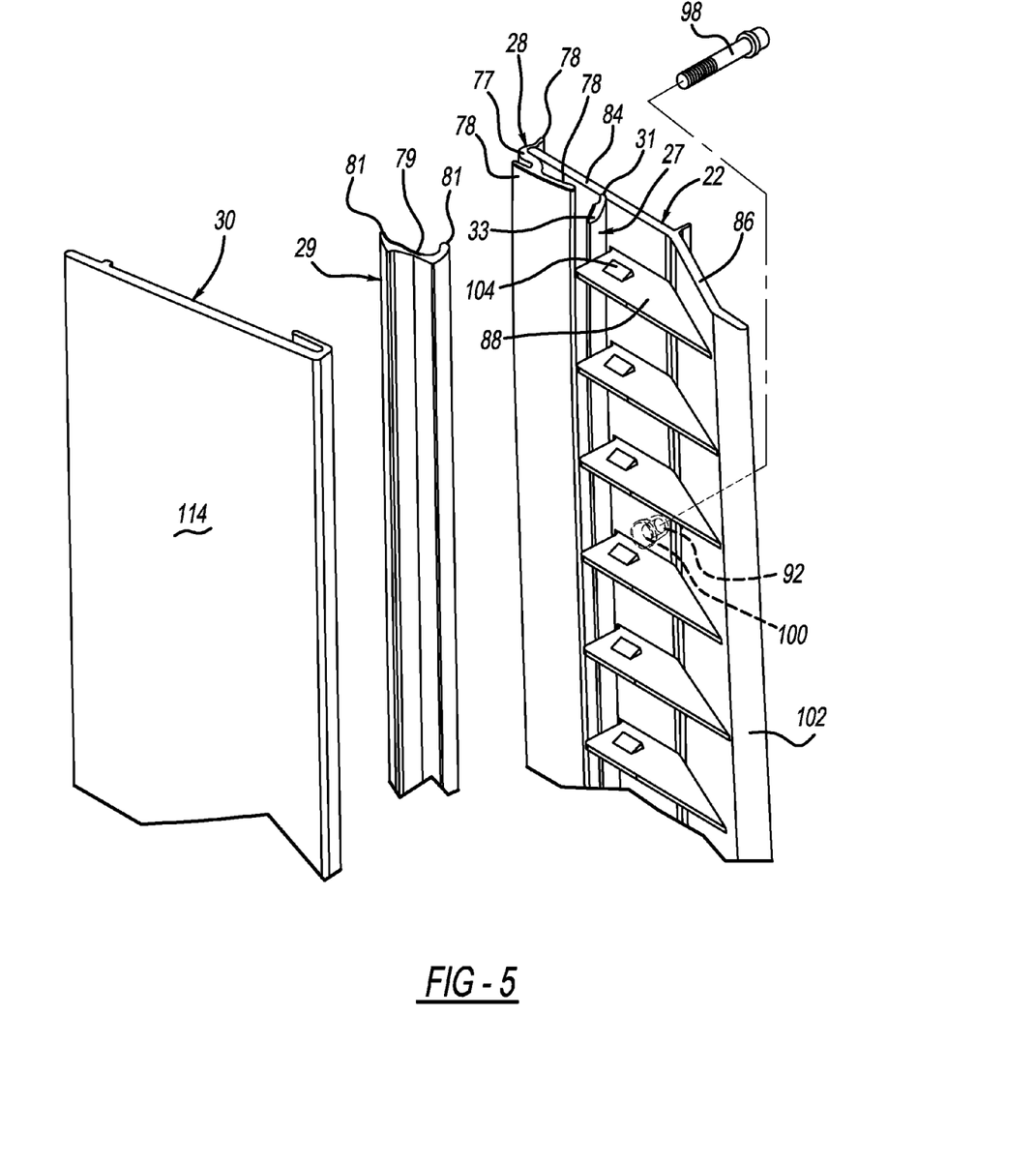
FIG. 5 is an exploded perspective view of a pillar portion of the daylight opening system of FIG. 2.
Figure 6:
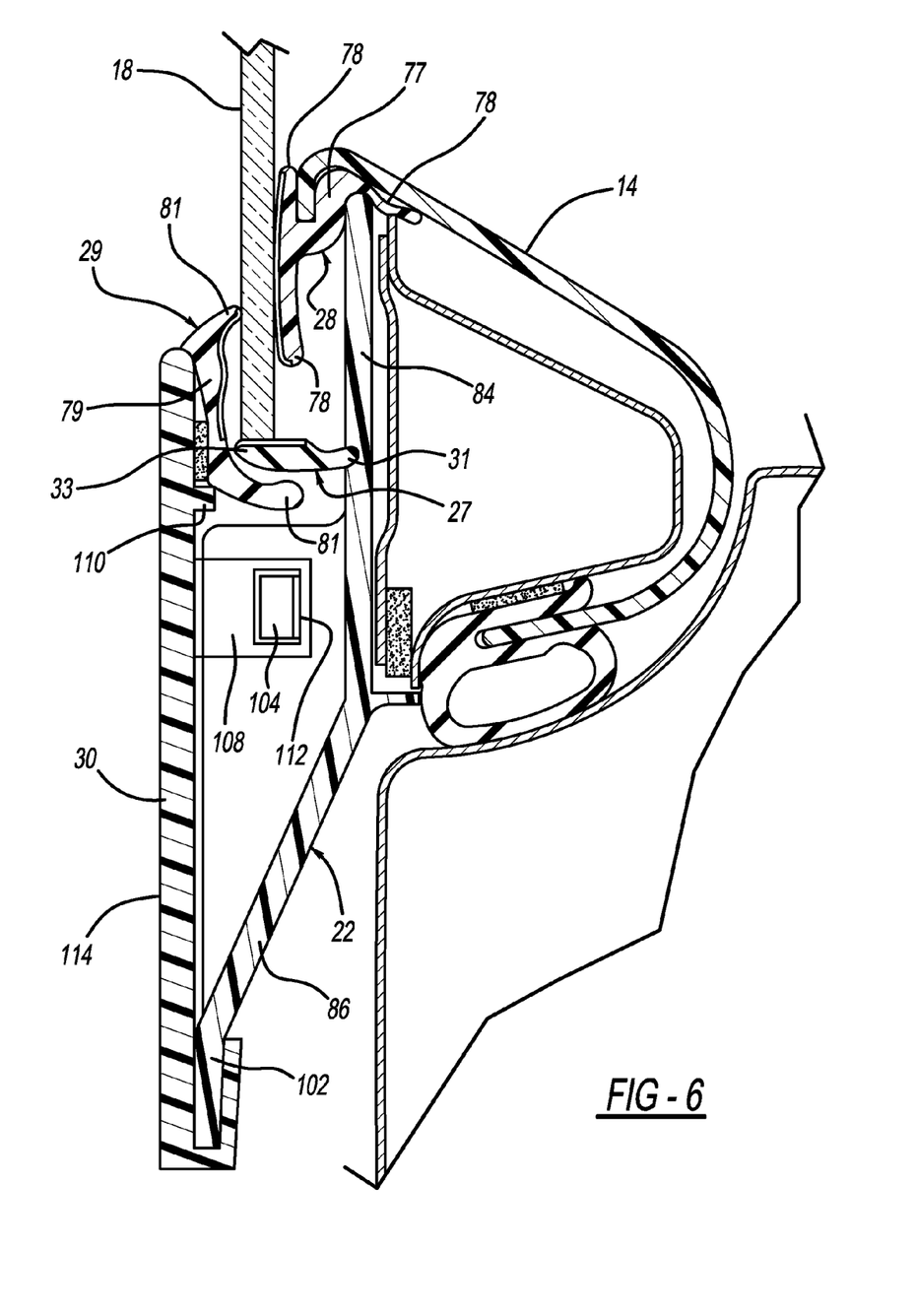
FIG. 6 is a cross-sectional view of the daylight opening system including the carrier secured to the door panel and taken through line 6-6 of FIG. 2.

The daylight opening system 10 is shown in FIG. 2 as being broken away at an upper section A and a side section B. The daylight opening system 10 at the upper section A is shown in FIGS. 2-4 to include a carrier 22, one or more appliques (e.g., trim piece 24), a first seal 26, a second seal 27, a third seal 28 and a fourth seal 29. The daylight opening system 10 at the side section B is shown in FIGS. 2, 5 and 6 to include the carrier 22, the second seal 27, the third seal 28, the fourth seal 29, and one or more trim member or applique 30 (e.g., a pillar applique). As should be understood, the shape of the carrier 22 may change as the carrier 22 extends around the window opening 12 to accommodate specific shapes of mating components. The carrier 22, trim piece 24 and applique 30 may be formed from one or more polymeric and/or metallic materials, and the seals 26, 27, 28, 29 may be formed from one or more polymeric and/or elastomeric materials, for example.

As shown in FIGS. 3 and 4, section A of the carrier 22 may include a first attachment feature or flange 32, a second attachment feature or channel member 34, and a third attachment feature or flange 36. The flange 32 may be a generally flat, elongate member extending generally parallel to the window pane 18 and may include at least one nut 40. The nut 40 may extend from the flange 32 (in a direction toward the interior of the vehicle) for receipt of a fastener 46. The nut 40 can be integrally formed with the carrier 22 and may have a closed or blind end 48. The nut 40 may be insert molded or pressed into the carrier 22, for example, or otherwise secured thereto.

The channel member 34 may extend in a generally u-shaped configuration and may include a first leg 50 and a second leg 52 interconnected by a closed end 54. The first and second legs 50, 52 may define a plurality of oppositely protruding barbs 56 arranged near the closed end 54. The second leg 52 may also include another row of barbs 58 (shown in FIG. 4) inset along the leg 52 apart from the barbs 56. The closed end 54 may have a protuberance 60 extending opposite the first and second legs 50, 52 along the length of the closed end 54. The flange 32 and the channel member 34 may be integrally formed, such that the first leg 50 of the channel member 34 and the flange 32 have an inclusive angle greater than or equal to approximately ninety degrees. Likewise, the channel member 34 may be integrally formed with the flange 36, such that the second leg 52 of the channel member 34 and the flange 36 have an inclusive angle greater than or equal to approximately ninety degrees.

The flange 36 may be substantially coplanar with the flange 32 and may include a discontinuous lip portion 62 (shown in FIG. 4) extending perpendicularly outward (e.g., in a direction towards the vehicle exterior) from a surface 64 of the flange 36. It should be understood that while each of the projections 38, barbs 56, and lip portions 62 are shown and described as being discontinuous, it is contemplated that they may also be provided as continuous projections extending across the carrier 22. Likewise, while the protuberance 60 is shown and described as being continuous across the length of the closed end 54, it is also contemplated that the protuberance 60 may be discontinuous, or in other words, may be provided as a plurality of protuberances across the length of the closed end 54.

The remaining components in the upper section A of the daylight opening system 10 may include features designed for attachment to the carrier 22. In particular, the trim piece 24 may include a pair of inwardly projecting arms 66, an exterior facing surface 68, a plurality of aligning members 70, and a lip member 72 extending from one of the arms 66. The arms 66 may be sized and arranged to extend about the channel member 34 and may define indentions 74 correspondingly sized and located with the barbs 56, 58 of the channel member 34. In this way, the trim piece 24 may be removably received on the carrier 22 such that the exterior facing surface 68 may define a peripheral border for the window opening 12. The aligning members 70 may assist in aligning and spacing the trim piece 24 about the window opening 12. Furthermore, the lip member 72 may be aligned with the lip portion 62 of the flange 36 to provide a channel opening for receipt of a portion of the first seal 26, as shown in FIG. 4.

As shown in FIGS. 5 and 6, the side section B of the carrier 22 may have configuration that differs from the configuration of the carrier 22 at section A. That is, the side section B of the carrier 22 may define a flange portion 84, an arm portion 86, and a plurality of tab members 88. The flange portion 84 may be substantially similar to the flange 32. For example, flange portion 84 may extend parallel to the window pane 18 and may include at least one nut 92. The nut 92 may extend outwardly from the flange portion 84 (e.g., in a direction toward an interior of the vehicle 16) for receipt of a fastener 98. The nut 92 may be attached to or integrally formed with the carrier 22 and may have a closed or blind end 100.

The arm portion 86 may be integrally formed with the flange portion 84 and may terminate at an attachment portion 102. The arm portion 86 may be angled from the flange portion 84 to provide spacing for receipt of the third seal 28. For example, the arm portion 86 may be angled to provide an inclusive angle with the flange portion 84 greater than or equal to approximately ninety degrees, and more particularly, greater than or equal to one-hundred-thirty-five degrees. The attachment portion 102 may be sized and angled to receive and align the pillar applique 30. Likewise, the tab members 88, which extend perpendicularly to the flange portion 84 and the arm portion 86, may each include a barb 104 to assist in retaining and aligning the pillar applique 30.

The remaining components in the side section B of the daylight opening system 10 may include features designed for attachment to the carrier 22. In particular, the pillar applique 30 may include an inwardly projecting arm 106, a plurality of locking tabs 108, and at least one aligning member 110. The arm 106 may be sized and arranged to extend about the attachment portion 102 for aligning the pillar applique 30 with the carrier 22. Likewise, the locking tabs 108 may correspond in number and placement of the tab members 88 and may include guide slots 112 for receipt of the barbs 104. In this way, the pillar applique 30 may be removably received on the carrier 22 such that an exterior facing surface 114 may define a peripheral border for the window opening 12, similarly to the trim piece 24. The aligning members 110 may assist in aligning and spacing the pillar applique 30 about the window opening 12.

As shown in FIGS. 3 and 4, the first seal 26 may include sealing members 76 and an anchor members 80. The sealing members 76 may sealingly engage the vehicle 16 (e.g., the vehicle frame) and the trim piece 24 to prevent moisture, dirt, noise and/or debris or foreign objects from entering the interior of the vehicle 16. The first seal 26 may be integrally formed with the flange 36 of the carrier 22. The first seal 26 may be overmolded onto the flange 36 (e.g., around the lip portion 62, as shown in FIG. 4) via a two-shot injection molding procedure, for example, such that the anchor member 80 may extend into the channel defined by the lip member 72 and the lip portion 62.

As shown in FIGS. 3-6, the second seal 27 may include a first end 31 and a second end 33. At section A, the first end 31 may be attached to the flange 32 of the carrier 22 between a distal end of the flange 32 and the channel member 34, as shown in FIG. 4. At section B, the first end 31 may be attached to the flange portion 84 of the carrier 22, as shown in FIG. 6.

The second seal 27 may be attached to the carrier 22 via tape, adhesive bond, clips, snap fit, press fit, and/or any other attachment means or method. In some embodiments, the second seal 27 could be overmolded onto or otherwise integrally formed with the flange 32. The second end 33 of the second seal 27 may sealingly engage an edge of the window pane 18 when the window pane 18 is in a closed position (FIGS. 4 and 6) and may cooperate with the third and fourth seals 28, 29 to prevent moisture, dirt, noise and/or debris or foreign objects from entering the interior of the vehicle 16.

The third seal 28 may include a body 77 and a plurality of sealing members 78 extending from the body 77. The third seal 28 may be integrally formed the carrier 22. The third seal 28 may be overmolded onto the flanges 32, 84 via a two-shot injection molding procedure such that the body 77 may extend around distal ends of the flanges 32, 84 at sections A and B, respectively. One or more of the sealing members 78 may sealingly engage an interior surface of the window pane 18 while another one or more of the sealing members 78 may sealingly engage the vehicle frame or door frame 14 (as shown in FIGS. 4 and 6). In this manner, the third seal 28 may cooperate with the second and fourth seals 27, 29 to prevent moisture, dirt, noise and/or debris or foreign objects from entering the interior of the vehicle 16.

The fourth seal 29 may include a body 79 and sealing members 81 extending from the body 79. At section A, the body 79 may be attached to the trim piece 24, as shown in FIG. 4. At section B, the body 79 may be attached to the pillar applique 30, as shown in FIG. 6. Additionally or alternatively, one of the sealing members 81 can be attached to the second seal 27. The fourth seal 29 may be attached to the trim piece 24, pillar applique 30 and/or the second seal 27 via taping, adhesive bonding, clipping press fit, and/or any other attachment means or method. In some embodiments, the fourth seal 29 could be overmolded onto the trim piece 24 and/or pillar applique 30 via a two-shot molding process, for example. The sealing members 81 of the fourth seal 29 may sealingly engage an exterior surface of the window pane 18 when the window pane 18 is in a closed position (FIGS. 4 and 6) and may cooperate with the second and third seals 27, 28 to prevent moisture, dirt, noise and/or debris or foreign objects from entering the interior of the vehicle 16.

It should be understood that while the carrier 22 is shown as having a particular shape and configuration for attachment with the trim piece 24, the seals 26, 27, 28, 29 and the pillar applique 30, other configurations and/or shapes are contemplated and fall within the scope of the present disclosure. For example, the carrier 22 may be configured for receipt of an outer sash molding, a belt molding, a mirror sail molding, a glass run channel seal, an outer door seal, and/or interior trim window garnish. Additionally or alternatively, in some embodiments of the daylight opening system 10, one or more of the trim piece 24, the seals 26, 27, 28, 29 and/or the pillar applique 30 could include alternative shapes and/or configurations to suit a given application.

With continued reference to FIGS. 4 and 6, the daylight opening system 10 may be pre-assembled prior to shipment or may be individually mounted proximate the door frame 14. For example, if the daylight opening system 10 is provided to the customer as a pre-assembled module, the carrier 22 and all attached components may be secured to the door frame 14 of the vehicle 16 with the fastener 46, 98 and nut 40, 92 attachments. The fastener 46, 98 may be secured to the carrier 22 proximate an interior-facing side of the door frame 14 of the vehicle 16, allowing for access to the attachment features without deformation of any attachment componentry. Interior window garnish trim may then be assembled to the vehicle 16 to cover the carrier attachment features (e.g., fastener 46, 98 and nut 40, 92 attachments). Pre-assembly of the daylight opening system 10 may reduce the number of individual components shipped to the customer and may allow for secondary equipment to be used for assembling the module. This secondary equipment, in turn, may allow for tighter tolerancing and improved fit/finish.

Alternately, however, if the daylight opening system 10 is provided to the customer as independent components, securing the carrier 22 to the door frame 14 may still provide reduced tolerancing and improved fit/finish due to the precision dimensions of the molded in nut. For example, the outside diameter (OD) of the nut 40 may have a precision dimension (e.g., 6.00 millimeters with a tolerance of plus 0.25 millimeters and minus 0.00 millimeters) and the fastener hole in the interior-facing side of the door frame 14 of the vehicle 16 may have a corresponding precision dimension (e.g., 6.25 millimeters with a tolerance of plus 0.25 millimeters and minus 0.00 millimeters). The remaining components may be attached to the carrier 22 through normal attachment features, such as clips, molded snaps, and/or other fasteners. Again, interior window garnish trim may then be assembled to the vehicle 16 to cover the carrier attachment features (e.g., fastener 46, 98 and nut 40, 92 attachments).

Attaching one or more of the seals 26, 27, 28, 29 to the carrier 22, the trim piece 24 and/or the pillar applique via an overmolding process may improve the integrity of the seals between the door frame 14 and the window pane 18, between the door frame 14 and the trim piece 24 or pillar applique 30, and between the window pane 18 and the trim piece 24 or pillar applique 30. Overmolding one or more of the seals 26, 27, 28, 29 may eliminate or reduce gaps between adjacent components and/or variations in the shapes and/or sizes of the components due to manufacturing tolerances and imperfections. Reducing or eliminating such gaps and variations improves fit and finish of the daylight opening system 10.

While the nuts 40, 92 are described above as being attached to or integrally formed with the carrier 22 and locating the carrier 22 relative to the door frame 14, in some embodiments, one or more of the nuts 40, 92 could alternatively be attached to or integrally formed with the door frame 14. In such embodiments, one or more of the fasteners 46, 98 may be attached to or integrally formed with the carrier 22 and may locate the carrier 22 relative to the door frame 14. It will also be appreciated that in addition to or in the alternative to the nuts 40, 92 and fasteners 46, 98, other fastening devices and/or fastening means (e.g., welding, clips, snap fit, press fit, etc.) could be employed to secure the carrier 22 to the door frame 14.

The foregoing description of the embodiments has been provided for purposes of illustration and description. It is not intended to be exhaustive or to limit the disclosure. It will be appreciated that the daylight opening system 10 could be adapted for use with a sunroof, a trunk or any other opening in the vehicle 16. Furthermore, while exemplary dimensions and tolerances are provided above for the outside diameter of the nut 40 and the fastener hole, it will be appreciated that variations to one or both of these dimensions and/or tolerances are within the scope of the present disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for use with a vehicle window opening comprising:
    a carrier adapted to be secured to a door of a vehicle
    a trim member secured to the carrier and cooperating with the carrier to define a space in which a window pane is selectively receivable;
    a third seal integrally formed with the carrier and configured to sealingly engage the window pane;
    a first seal integrally formed with the carrier and configured to sealingly engage the trim member and a frame member of the vehicle;
    a fourth seal attached to the trim member and configured to sealingly engage the window pane, the fourth seal being separate from the third and first seals; and
    a second seal attached to the carrier and directly engaging the fourth seal.

2. The apparatus of claim 1, wherein the trim member includes one of a trim piece extending along an upper section of the door and a molding applique extending along a pillar of the vehicle.

3. The apparatus of claim 1, wherein the third seal is overmolded onto the carrier.

4. The apparatus of claim 1, wherein the third seal is overmolded onto the carrier by a two-shot molding process.

5. An apparatus for use with a window opening of a vehicle comprising:
    a carrier adapted to be secured to a door of the vehicle
    a trim member secured to the carrier and cooperating with the carrier to define a space in which a window pane is selectively receivable;
    a third seal integrally formed with the carrier and configured to sealingly engage the trim member and a frame member of the vehicle;
    a first seal integrally formed with the carrier and configured to sealingly engage the trim member and the window pane;
    a fourth seal attached to the trim member and configured to sealingly engage the window pane, the fourth seal being separate from the third and first seals; and
    a second seal attached to the carrier and directly engaging the fourth seal.

6. The apparatus of claim 5, wherein the trim member includes one of a trim piece extending along an upper section of the door and a molding applique extending along a pillar of the vehicle.

7. The apparatus of claim 5, wherein the third seal is overmolded onto the carrier.

8. The apparatus of claim 5, wherein the third seal is overmolded onto the carrier by a two-shot molding process.

9. The apparatus of claim 5, wherein the carrier, trim member and the third seal form a module that is adapted to be assembled on the vehicle.

10. A method comprising:
    integrally forming a third seal onto a carrier;
    integrally forming a first seal onto the carrier;
    forming a daylight opening module by securing a trim piece onto a first attachment feature of the carrier and securing a molding member onto a second attachment feature of the carrier;
    securing the daylight opening module to a door frame of a vehicle such that the third and first seals at least partially extend around a window opening in the door frame;
    attaching a fourth seal to the trim piece; and
    attaching a second seal to the carrier, such that the second seal directly engages the fourth seal.

11. The method of claim 10, wherein securing the daylight opening module to the door frame includes providing a selectively sealed relationship between a window pane and one of the door frame, trim piece and molding member via one of the third and first seals.

12. The method of claim 10, wherein integrally forming the third and first seals with the carrier includes overmolding the third and first seals onto first and second flanges of the carrier.

13. The method of claim 12, wherein the third and first seals are overmolded onto first and second flanges by a two-shot molding process.

14. The method of claim 10, wherein the molding member and the trim piece are secured onto the carrier after the third and first seals are integrally formed onto the carrier.

\* \* \* \* \*